US008990070B2

(12) United States Patent
Dayan et al.

(10) Patent No.: US 8,990,070 B2
(45) Date of Patent: Mar. 24, 2015

(54) COMPUTER-BASED CONSTRUCTION OF ARBITRARILY COMPLEX FORMAL GRAMMAR EXPRESSIONS

(75) Inventors: Yigal S. Dayan, Jerusalem (IL); Gil Fuchs, Mevasert Tsiyon (IL); Josemina M. Magdalen, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 13/299,692

(22) Filed: Nov. 18, 2011

(65) Prior Publication Data

US 2013/0132070 A1 May 23, 2013

(51) Int. Cl.
*G06F 17/27* (2006.01)
*G06F 9/44* (2006.01)

(52) U.S. Cl.
CPC ... *G06F 8/34* (2013.01); *G06F 8/37* (2013.01)
USPC ............................... 704/9; 704/257; 704/252

(58) Field of Classification Search
USPC ............... 704/1–10, 251, 255, 257, 270, 252
See application file for complete search history.

(56) References Cited

U.S. PATENT DOCUMENTS

| 7,191,119 B2* | 3/2007 | Epstein et al. ................ 704/10 |
| 7,286,978 B2* | 10/2007 | Huang et al. .................... 704/9 |
| 7,636,703 B2 | 12/2009 | Taylor |
| 7,702,629 B2 | 4/2010 | Cytron et al. |
| 7,912,808 B2 | 3/2011 | Pandya |
| 2004/0122654 A1* | 6/2004 | Moore ............................ 704/4 |
| 2007/0219773 A1 | 9/2007 | Roux et al. |
| 2009/0248652 A1 | 10/2009 | Iwayama et al. |
| 2011/0257962 A1* | 10/2011 | Gopi .............................. 704/9 |

FOREIGN PATENT DOCUMENTS

| CN | 101158948 A | 4/2008 |
| EP | 0575192 A2 | 12/1993 |

OTHER PUBLICATIONS

English Abstract and Translation for CN101158948A, published Apr. 9, 2008, Total 9 pages.
Frej, D. and T. Parr, "ANTLR v3 Documentation", [online], [Retrieved on Dec. 28, 2011]. Retrieved from the Internet at <URL: http://www.antlr.org/wiki/display/ANTLR3/ANTLR+v3+documentation>, Total 3 pp.

(Continued)

*Primary Examiner* — Huyen X. Vo
(74) *Attorney, Agent, or Firm* — Janaki K. Davda; Konrad, Raynes, Davda & Victor LLP

(57) ABSTRACT

A method, system and computer program product for building an expression, including utilizing any formal grammar of a context-free language, displaying an expression on a computer display via a graphical user interface, replacing at least one non-terminal display object within the displayed expression with any of at least one non-terminal display object and at least one terminal display object, and repeating the replacing step a plurality of times for a plurality of non-terminal display objects until no non-terminal display objects remain in the displayed expression, wherein the non-terminal display objects correspond to non-terminal elements within the grammar, and wherein the terminal display objects correspond to terminal elements within the grammar.

24 Claims, 26 Drawing Sheets

(56) References Cited

OTHER PUBLICATIONS

U.S. Appl. No. 13/299,640, filed Nov. 18, 2011, entitled "Scalable, Rule-Based Processing", invented by Cohen, D., Y.S. Dayan, J.M. Magdalen, and Y. Tzaban, Total 26 pp.
Wikipedia, "Backus-Naur Form", [online], [Retrieved on Jan. 4, 2012]. Retrieved from the Internet at <URL: http://en.wikipedia.org/wiki/Backus%E2%80%93Naur_Form> Total 7 pp.
Preliminary Amendment, Jul. 5, 2012, for U.S. Appl. No. 13/542,460, filed Jul. 5, 2012 by D. Cohen et al., Total 6 pp. [57.262C1 (PrelimAmend)].
Preliminary Amendment, Jul. 5, 2012, for U.S. Appl. No. 13/299,640, filed Nov. 18, 2011 by D. Cohen et al., Total 6 pp. [57.262 (PrelimAmend)].
U.S. Appl. No. 13/542,460, filed Jul. 5, 2012, entitled "Scalable, Rule-Based Processing", invented by Cohen, D., Y.S. Dayan, J.M. Magdalen, and Y. Tzaban, Total 26 pp. [57.262C1 (Appln)].
Office Action 1, Apr. 21, 2014, for U.S. Appl. No. 13/299,640, filed Nov. 18, 2011 by D. Cohen et al., Total 25 pp. [57.262 (OA1)].
Paschke, A., "ECA-RuleML: An Approach Combining ECA Rules with Temporal Interval-Based KR Event/Action Logics and Transactional Update Logics", [online], [Retrieved on Oct. 1, 2013]. Retrieved from the Internet at <URL: http://arxiv.org/ftp/cs/papers/0610/0610167.pdf>, Nov. 2005, Total 25 pp.
Response to Office Action 1, Jul. 21, 2014, for U.S. Appl. No. 13/299,640, filed Nov. 18, 2011 by D. Cohen et al., Total 10 pp. [57.262 (ROA1)].
"A CoRSA Template", [online], [Retrieved on Nov. 16, 2011]. Retrieved from the Internet at <URL: http://johnward.net/cv/DissertationWeb/Dissertation.htm, Total 74 pp.
Chomsky, N., "Noam Chomsky's Generative Grammars", [online], [Retrieved Nov. 16, 2011]. Retrieved from the Internet at <URL: http://www.objectivegui.com/en/WebMS_key_concepts/Chomsky_generative_grammars.html>, Objective GUI, 2007, Total 1 p.
Final Office Action 1, Aug. 15, 2014, for U.S. Appl. No. 13/299,640, filed Nov. 18, 2011 by D. Cohen et al., Total 8 pp.
Havsiyevych, I., "Formal Grammars and Tools for Java", [online], [Retrieved on Nov. 16, 2011]. Retrieved from the Internet at <URL: http://illya-keeplearning.blogspot.com/2009/03/formal-grammar.html>, Keep Learning Personal Personal Blog of Illya Haysiyevych, Mar. 29, 2009, Total 8 pp.
ObjectiveGUI, "Site Grammar ®: a Smart Web Construction Kit", [online], [Retrieved on Nov. 16, 2011]. Retrieved from the Internet at <URL: http://www.objectivegui.com/en/WebMS_key_concepts/Site_grammar.html>, ObjectiveGUI, 2007, Total 1 p.
Response to Final Office Action 1, Nov. 3, 2014, for U.S. Appl. No. 13/299,640, filed Nov. 18, 2011 by D. Cohen et al., Total 7 pp.
Notice of Allowance 1, Nov. 26, 2014, for U.S. Appl. No. 13/299,640, filed Nov. 18, 2011 by D. Cohen et al., Total 13 pp.

* cited by examiner

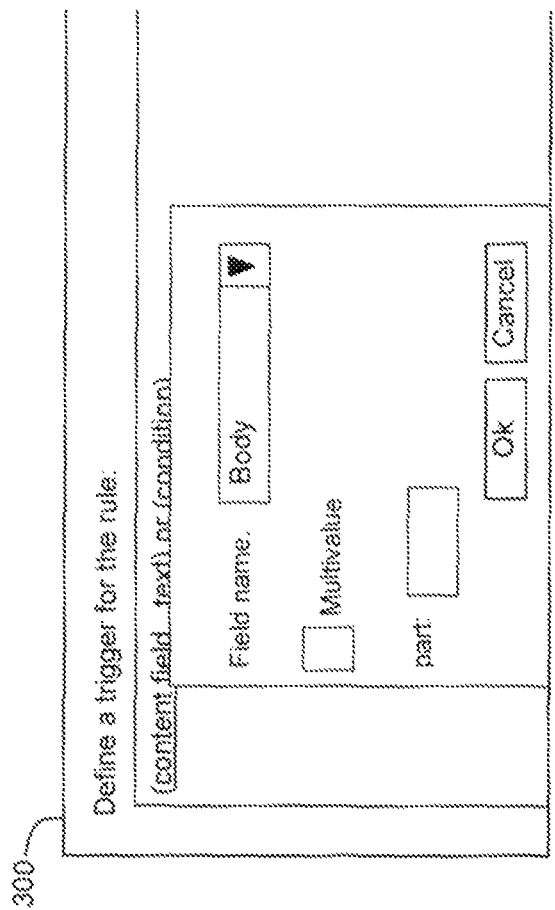

Define a trigger for the rule:

(@Body : (~account~ d/5 (~manager~ or ~sales~) ) )

Define a trigger for the rule:

```
import_date ($EmailSentDate, 'dd/MM/yyyy') < date('now') - period
('7 0:0:0')1
```

Fig. 3V

COMPUTER-BASED CONSTRUCTION OF ARBITRARILY COMPLEX FORMAL GRAMMAR EXPRESSIONS

FIELD OF THE INVENTION

The invention relates in general to computer-based systems, methods and computer program products for constructing formal grammar expressions.

BACKGROUND OF THE INVENTION

Computer-based systems often employ formal grammars defined using Bachus-Naur Form (BNF) syntax in order to evaluate user-authored expressions. Unfortunately, a user who is unfamiliar with a specific formal grammar may have difficulty building an expression that is valid in that grammar. While tools have been proposed that enable a user to construct an expression while hiding, to a greater or lesser extent, the underlying formal grammar syntax from the user, such systems impose restrictions that limit what a user can do when building an expression.

SUMMARY OF THE INVENTION

A method, system and computer program product are provided for building an expression, including utilizing any formal grammar of a context-free language, displaying an expression on a computer display via a graphical user interface, replacing at least one non-terminal display object within the displayed expression with any of at least one non-terminal display object and at least one terminal display object, and repeating the replacing step a plurality of times for a plurality of non-terminal display objects until no non-terminal display objects remain in the displayed expression, wherein the non-terminal display objects correspond to non-terminal elements within the grammar, and wherein the terminal display objects correspond to terminal elements within the grammar.

In other aspects of the invention systems and and computer program products embodying the invention are provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
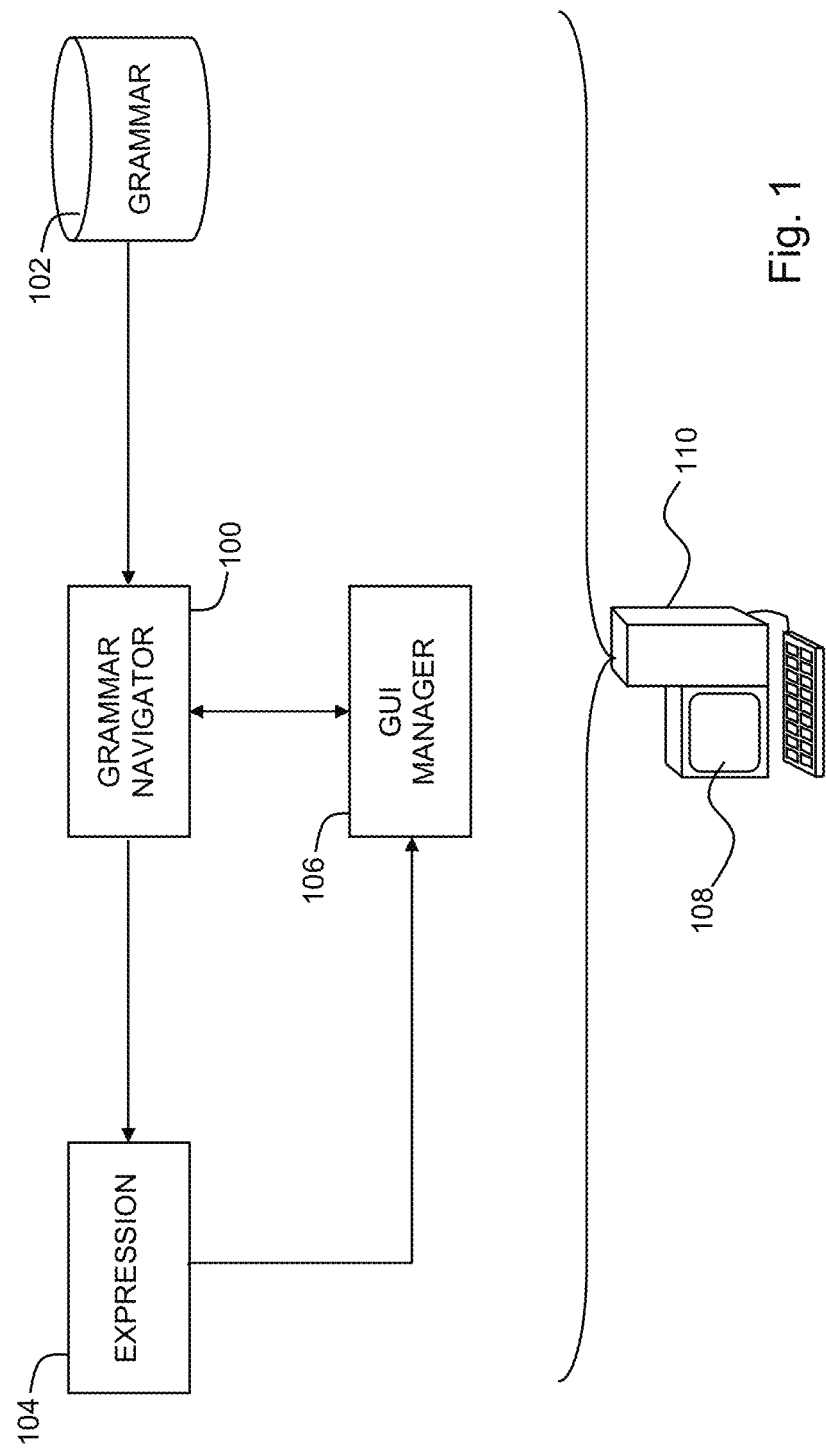
FIG. 1 is a simplified conceptual illustration of a system for computer-based construction of arbitrarily complex formal grammar expressions, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for computer-based construction of arbitrarily complex formal grammar expressions, constructed and operative in accordance with an embodiment of the invention. In the system of FIG. 1, a grammar navigator 100 is configured to utilize any formal grammar 102 of a context-free language, such as may be defined in a specification that conforms to the Backus-Naur Form (BNF). Grammar navigator 100 is configured to generate an expression 104, where expression 104 preferably initially includes a non-terminal display object corresponding to a root object defined in grammar 102. Grammar navigator 100 is also configured to identify one or more child nodes within grammar 102 that are directly traversable from a parent node within grammar 102, where the parent nodes are non-terminal elements within grammar 102 corresponding to non-terminal display objects in expression 104, and where the child nodes are themselves terminal or non-terminal elements within grammar 102.

A graphical user interface (GUI) manager 106 is configured to display expression 104 on a computer display 108 and receive a user selection of any non-terminal display object within the displayed expression 104. In response to the user selection, GUI 106 preferably displays on computer display 108 and separately from the displayed expression 104 a selection of candidate terminal display objects and/or non-terminal display objects that correspond to the child nodes identified by grammar navigator 100 within grammar 102 that are directly traversable from the parent node corresponding to the non-terminal display object selected by the user. GUI manager 106 is configured to receive a user selection of any of the displayed candidate terminal display objects and non-terminal display objects, and replace the non-terminal display object selected by the user within the displayed expression 104 with the selected candidate object(s), thereby resulting in a modified displayed expression 104.

Any of the elements shown in FIG. 1 are preferably implemented by one or more computers, such as a computer 110, by implementing the elements in computer hardware and/or in computer software embodied in a computer-readable storage medium in accordance with conventional techniques.

Figure 2:
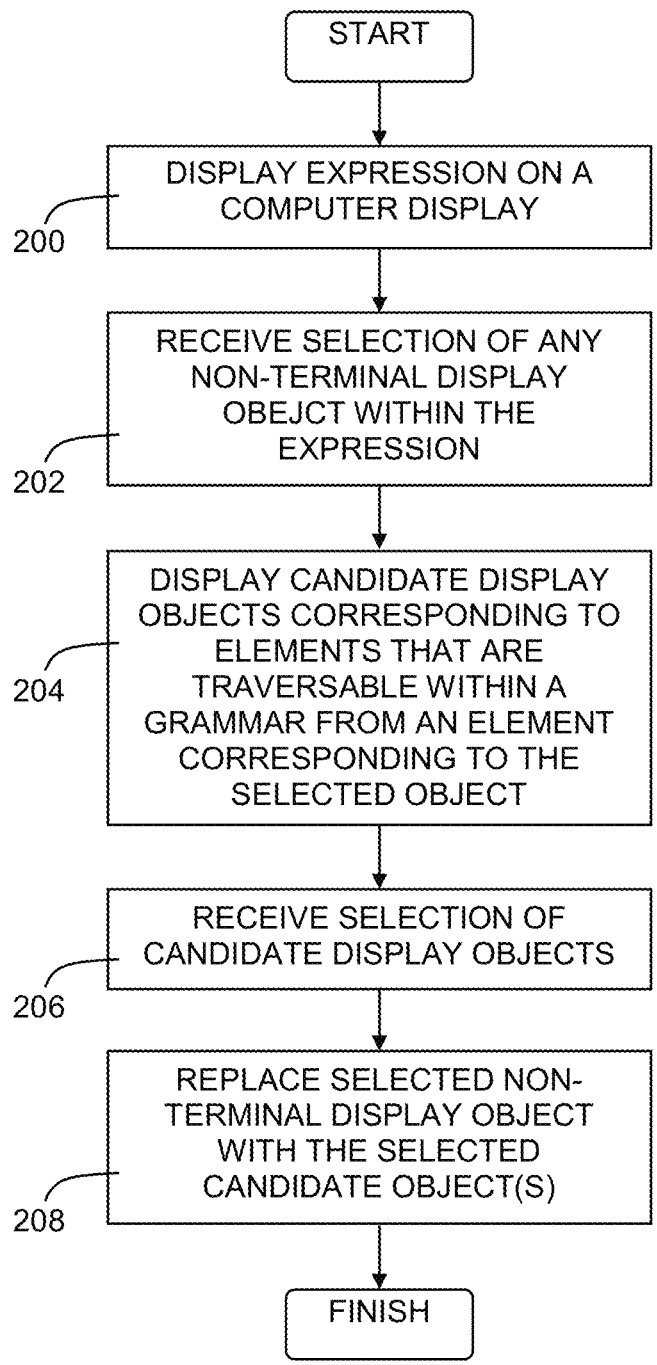
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, an expression is displayed on a computer display (step 200), where the expression includes one or more non-terminal display objects, and zero or more terminal display objects, where each non-terminal display object corresponds to a non-terminal element within a formal grammar of a context-free language, and where each terminal display object corresponds to a terminal element within the formal grammar. A user selection is received of any non-terminal display object within the displayed expression (step 202). In response to the user selection, a selection of candidate terminal display objects and/or non-terminal display objects is displayed (step 204), where the candidate display objects correspond to terminal or non-terminal elements within the grammar that are directly traversable from the non-terminal element within the grammar that corresponds to the non-terminal display object selected by the user. A user selection is received of any of the displayed candidate display objects (step 206). The non-terminal display object selected by the user within the displayed expression is replaced with the selected candidate object(s), thereby resulting in a modified displayed expression (step 208).

Steps 200-208 may be repeated until the displayed expression includes only terminal display objects, and preferably absent a predefined limit on the number of repetitions that may be performed.

The system of FIG. 1 and method of FIG. 2 may be illustrated in the context of an exemplary scenario as shown in FIGS. 3A-3I in which the following BNF grammar specification is employed having a root node which maps to various child and descendent nodes:

```
<root> ::= <boolean_condition>
<boolean_condition> ::=    <boolean_condition> and
                <boolean_condition> | <boolean_condition> or
                <boolean_condition> |
                <word_search_condition> | <numeric_condition> |
<date_condition> |
                not < boolean_condition>
<word_search_condition> ::= <field> : <text_condition>
<field> ::= $FieldName
<text_condition> ::= <text_condition> and <text_condition> |
                <text_condition> or <text_condition> |
                <text_condition> <distance_operator>
                <text_condition> |
                'word' | 'a phrase' | <wordlist> |
<condition> := ( <condition> ) or ( <condition> )
<word_search_condition> ::= <field> : <text_condition>
                All_Field_Search : <text_condition>
```

Figure 3A:
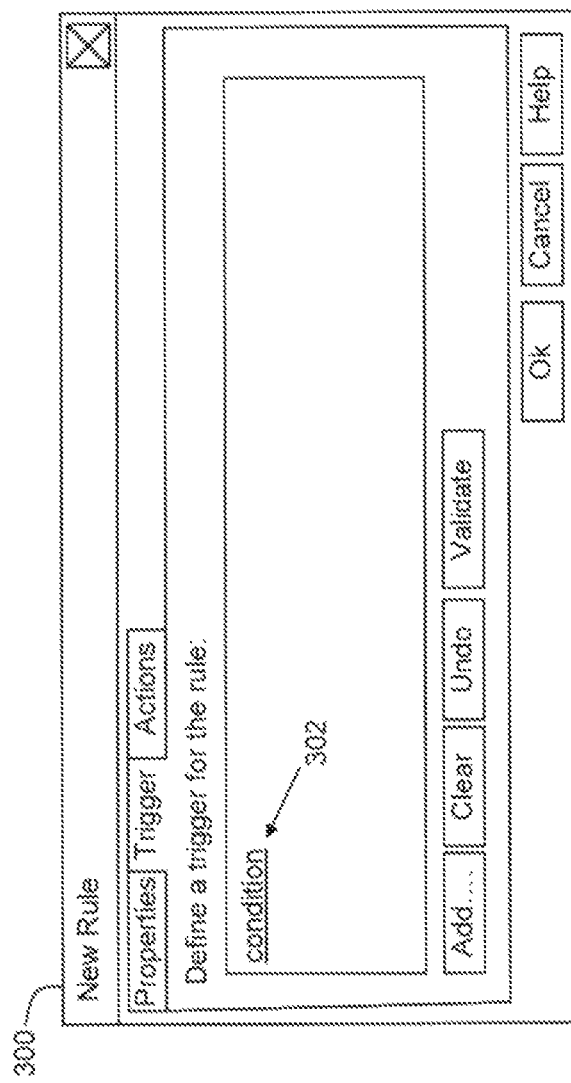
FIGS. 3A-3W are simplified graphical interfaces illustrating an exemplary implementation of the system of FIG. 1 and the method of FIG. 2, constructed and operative in accordance with an embodiment of the invention.
Figure 3B:
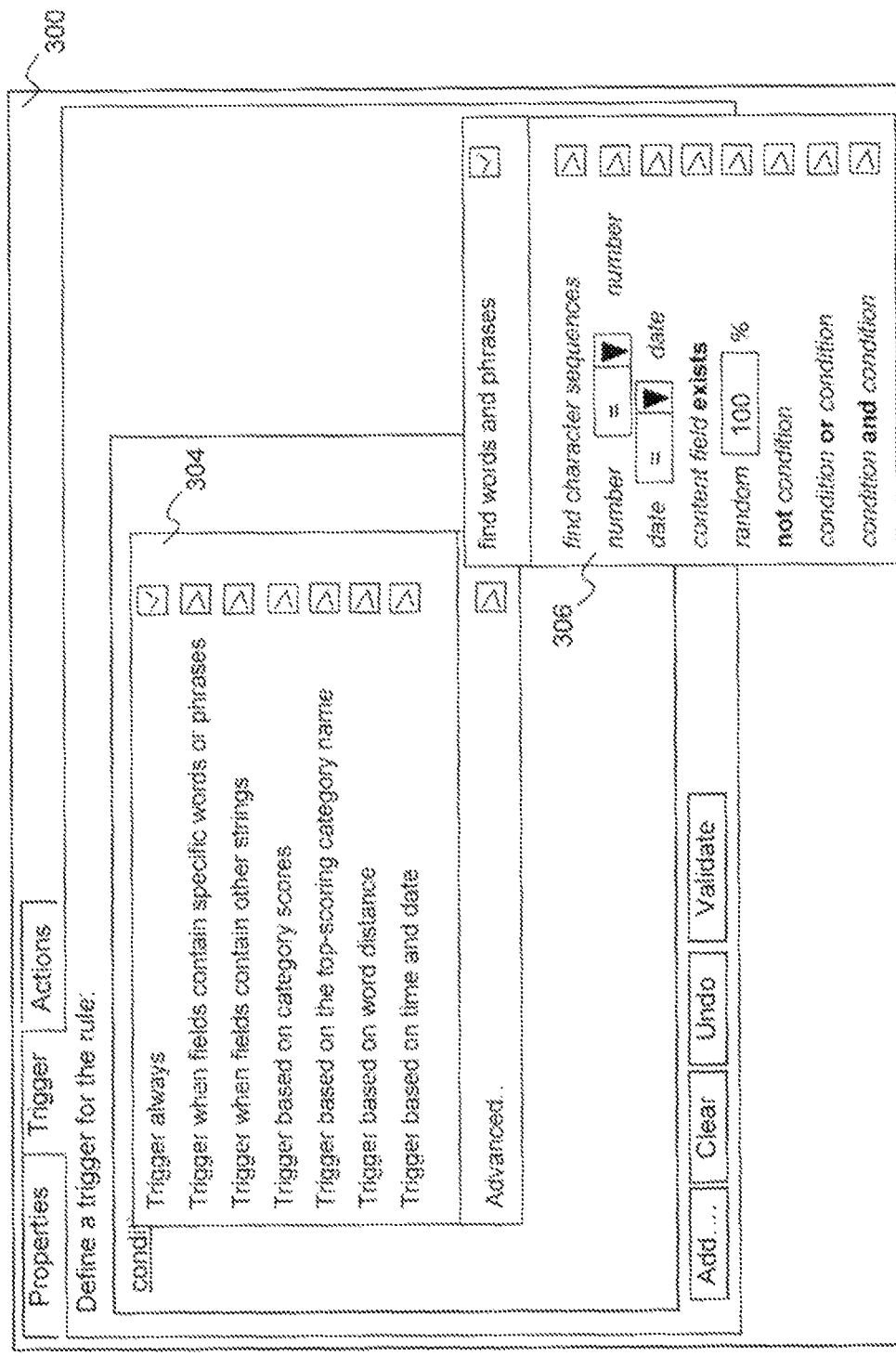
Figure 3C:
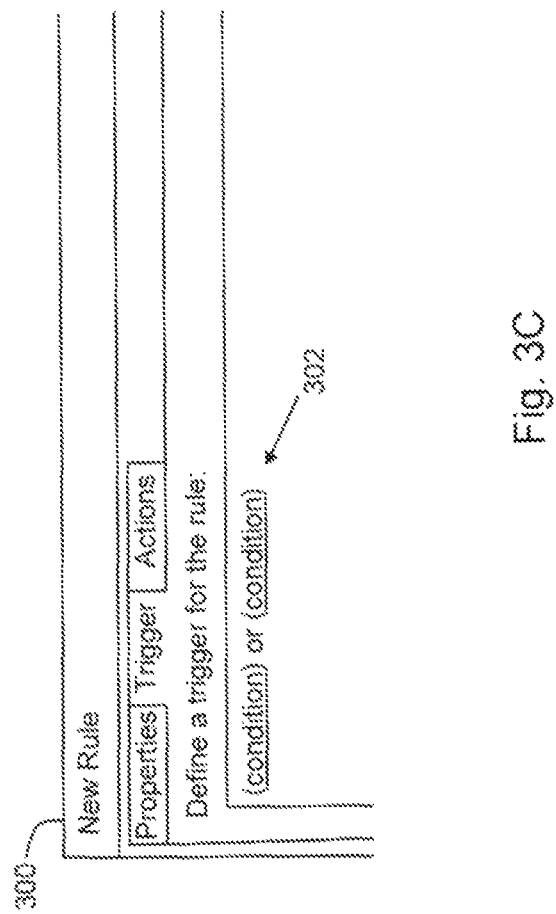

In FIG. 3A a GUI 300 is shown displaying an expression 302 having a single non-terminal display object labeled "condition" that is selectable by a computer user, such as by clicking on the non-terminal display object using a pointing device. When the non-terminal display object is selected, a sub-menu 304 is displayed, as is shown in FIG. 3B, which includes a number of predefined templates followed by an "Advanced" option which, when selected, causes a sub-menu 306 to be displayed, which includes entries that correspond to the root's child nodes in the BNF specification. When the user selects one of the entries in sub-menu 306, the non-terminal display object "condition" in expression 302 is replaced with the selected entry, such as with the "condition" OR "condition" option which allows more than one condition to be defined, as is shown in FIG. 3C, which corresponds to <condition>:=(<condition>) or (<condition>)

in the grammar specification.

Figure 3D:
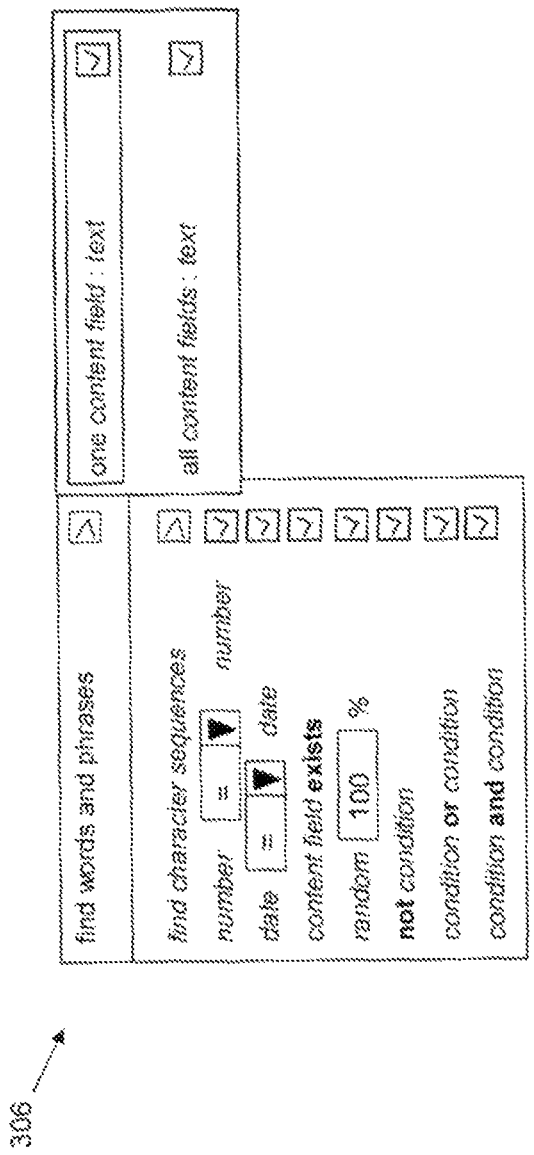
Figure 3E:
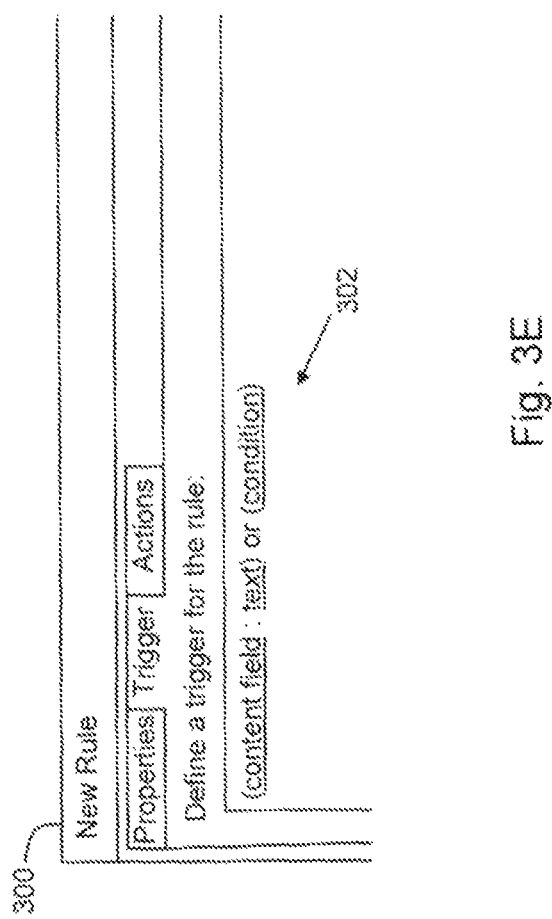

A word search condition is defined for the first "condition" in expression 302 by selecting the first "condition" and navigating sub-menu 306 as shown in FIG. 3D by selecting the "find words and phrases" option followed by the one "content field:text" option, which corresponds to <word_search_condition>  ::=  <field> : <text_condition>
All_Field_Search : <text_condition> in the grammar specification, where All_Field_Search is a terminal keyword meaning all input fields are to be searched, and ":" is an operator meaning "search for words". This causes the first "condition" in expression 302 to be replaced with "content field:text" as shown in FIG. 3E.

Figure 3G:
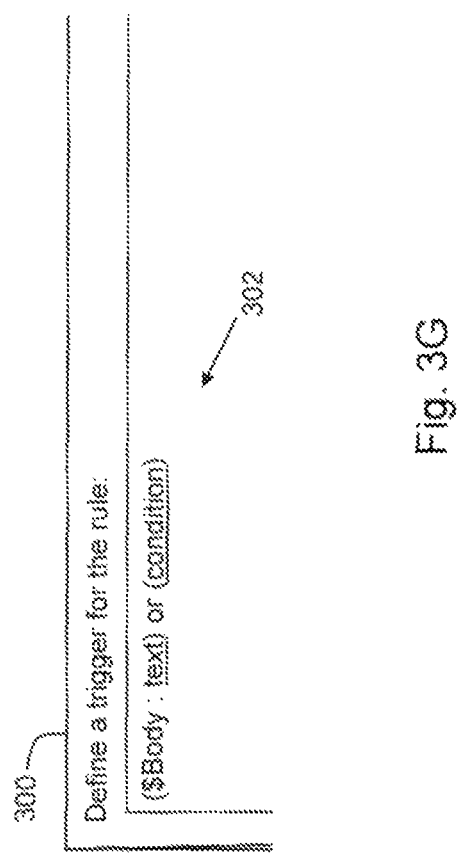
Figure 3H:
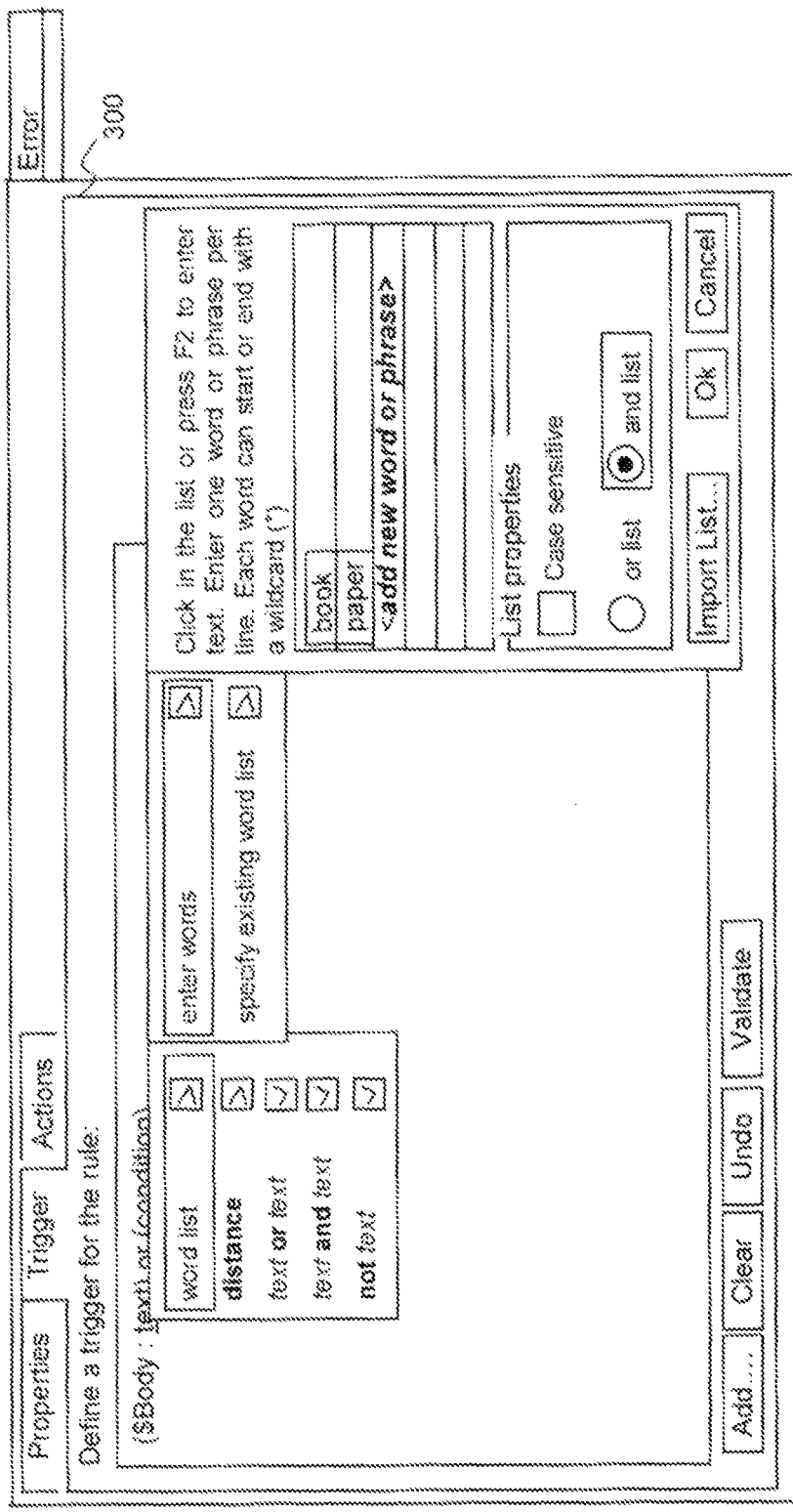
Figure 31:
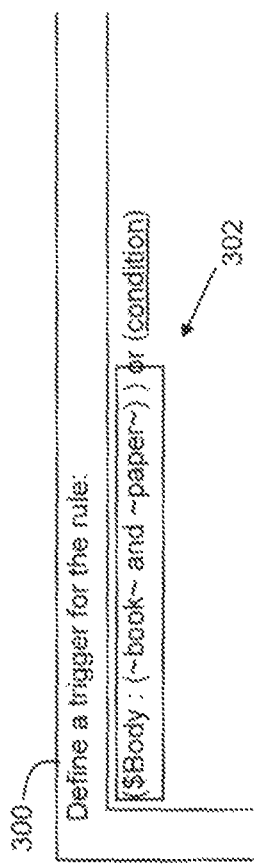

In FIG. 3F the "content field" non-terminal display object is replaced with a terminal display object, such as a "Body" field in a document, as shown in FIG. 3G. In FIG. 3H the "text" non-terminal display object is replaced with the terminal display objects "~book~" and "~paper~" as shown in FIG. 3I. The second "condition" non-terminal display object may be similarly replaced as described above.

Figure 3J:
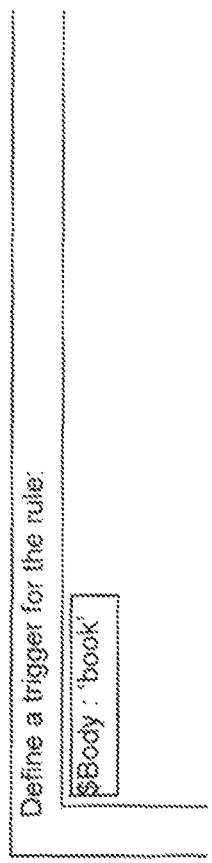
Figure 3K:
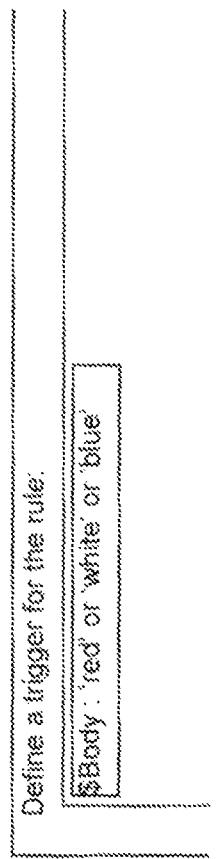
Figure 3L:
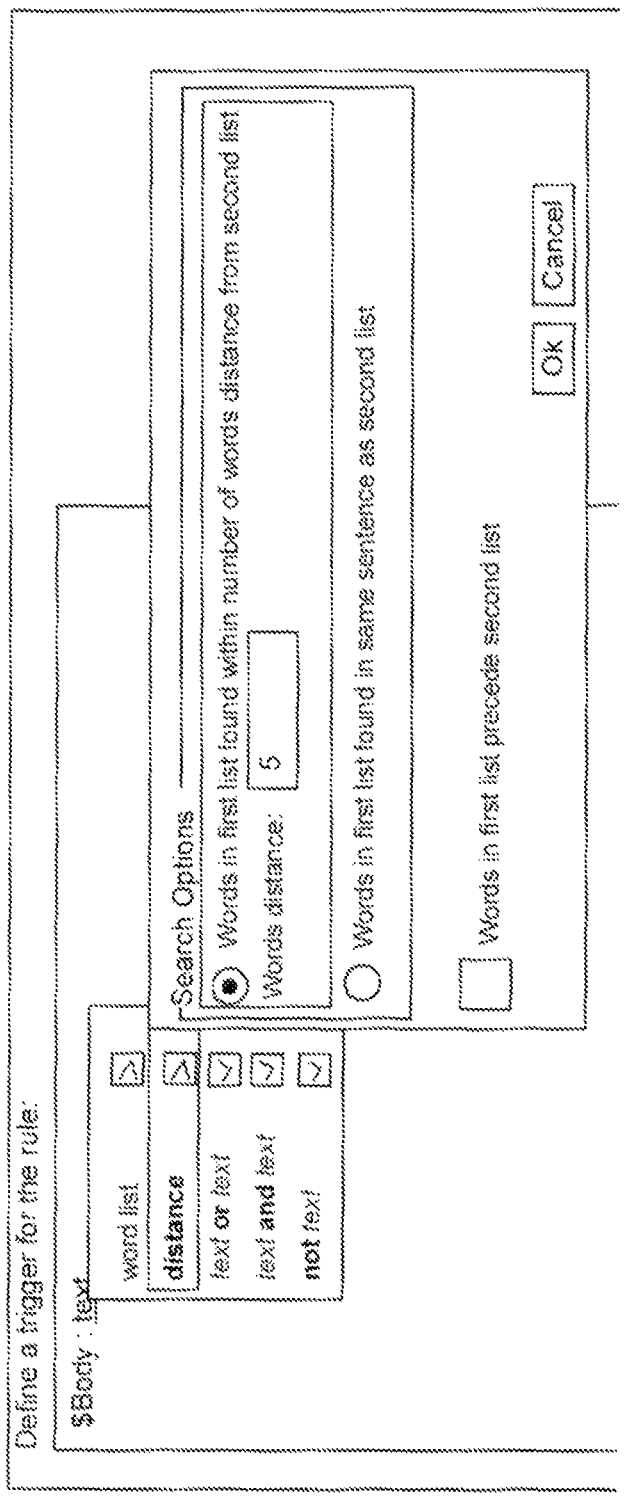
Figure 3N:
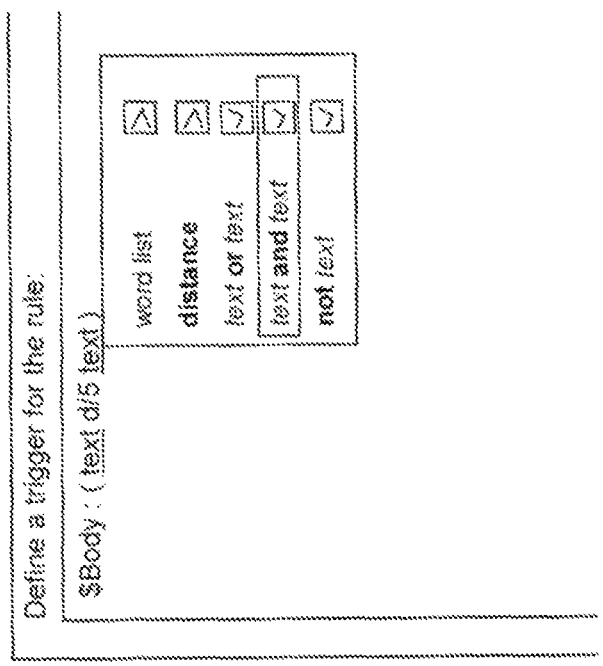
Figure 30:
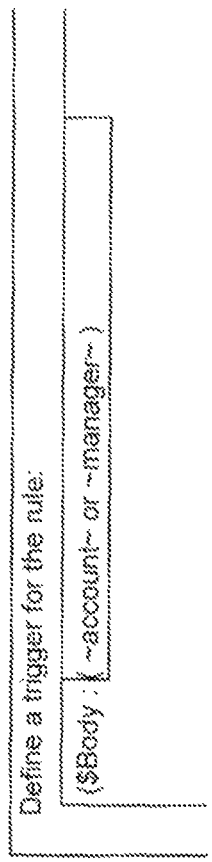

The system of FIG. 1 and method of FIG. 2 may be adapted for use with a grammar that is not context-free, where selecting a non-terminal display object in the displayed expression may result in different sub-menus being displayed depending on the current context of the object within the expression. For example, given the following specification <text_condition> ::= <text_condition> and <text_condition> |
<text_condition> or <text_condition> |
<text_condition> <distance_operator><text_condition> |
'word' | 'a phrase' | <wordlist> | a text condition is developed into a set of locations. For a single word, these are the locations where the word appears in a text, such as is shown in FIG. 3J. For multiple words, it is the union of the locations of the words, as shown in FIG. 3K. A distance operator may be employed to take two sets of locations and return a third set that meets the condition of distance between the words, such as is shown in FIG. 3L. In the example shown in FIG. 3M, the expression looks for the word "account" at a distance of five words or less from either "manager" or "sales". However, if the AND keyword is used, all location-sets are collapsed into a single TRUE or FALSE ("word1 and word2" is TRUE, if both words have non-empty location sets). For this reason, a distance operator that requires location-sets cannot operate on a "<text_condition>" that contains the AND keyword. Thus, a "<text_condition>" under a distance operator will be slightly different than other text_conditions. This may be implemented by having two different link names for "<text_condition>", or by minimizing the number of link names and add state information to each link instead. Thus, where a user selects "<text_condition>" in an expression and then selects the option "<text_condition><distance_operator><text_condition>", "<text_condition>" is replaced with "<text_condition><distance_operator><text_condition>". A state variable is preferably associated with each new "<text_condition>" object, such that when the new "<text_condition>" is selected, the AND option is grayed out as shown in FIG. 3N. The "text and text" and "not text" options are grayed out when the text is selected within the context of a distance operator.

Figure 3P:
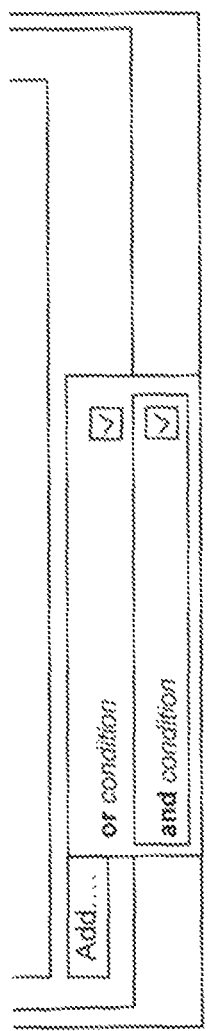
Figure 3Q:
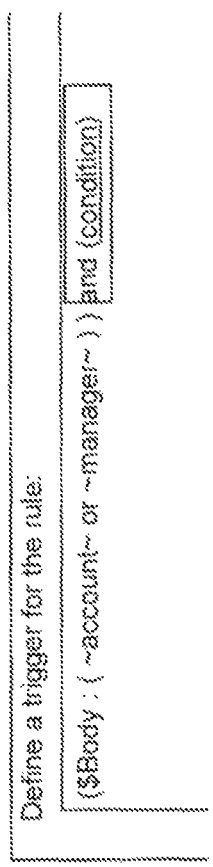

The system of FIG. 1 and method of FIG. 2 may be configured to enable expressions to be added to other expressions, particularly where an expression is a completed expression having only terminal display objects corresponding to terminal elements in the grammar. The expression may have been completed in an earlier expression-building session and imported into the current session, or may have been just completed during the current session. Thus, for example, given the initial condition shown in FIG. 3O, a new AND condition may be added as shown in FIG. 3P, resulting in the expression shown in FIG. 3Q. This may be supported in the grammar specification using the keyword <existing_expression> as follows <condition := (<existing_ expression>) or (<condition> )
(<existing_ expression>) and (<condition> )

Figure 3R:
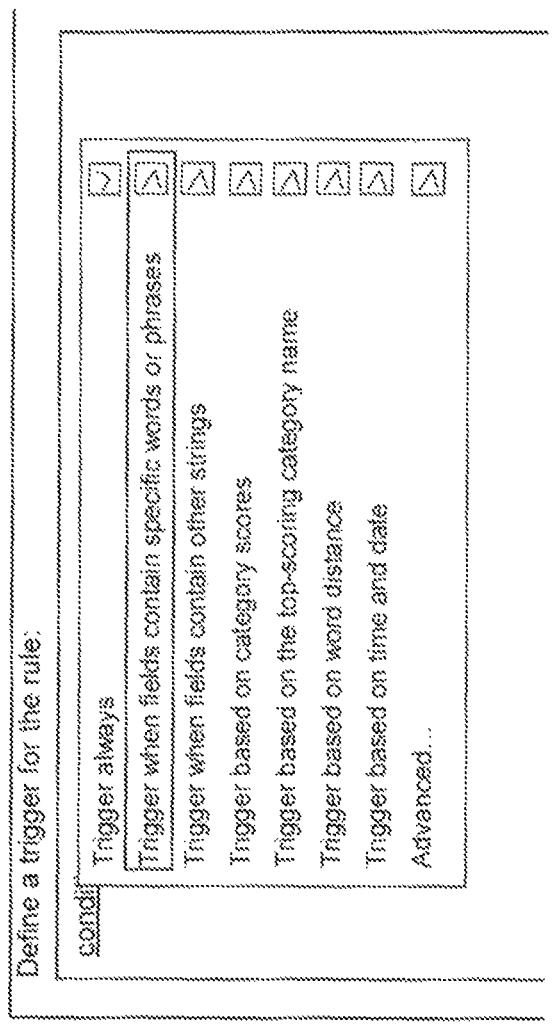
Figure 3S:
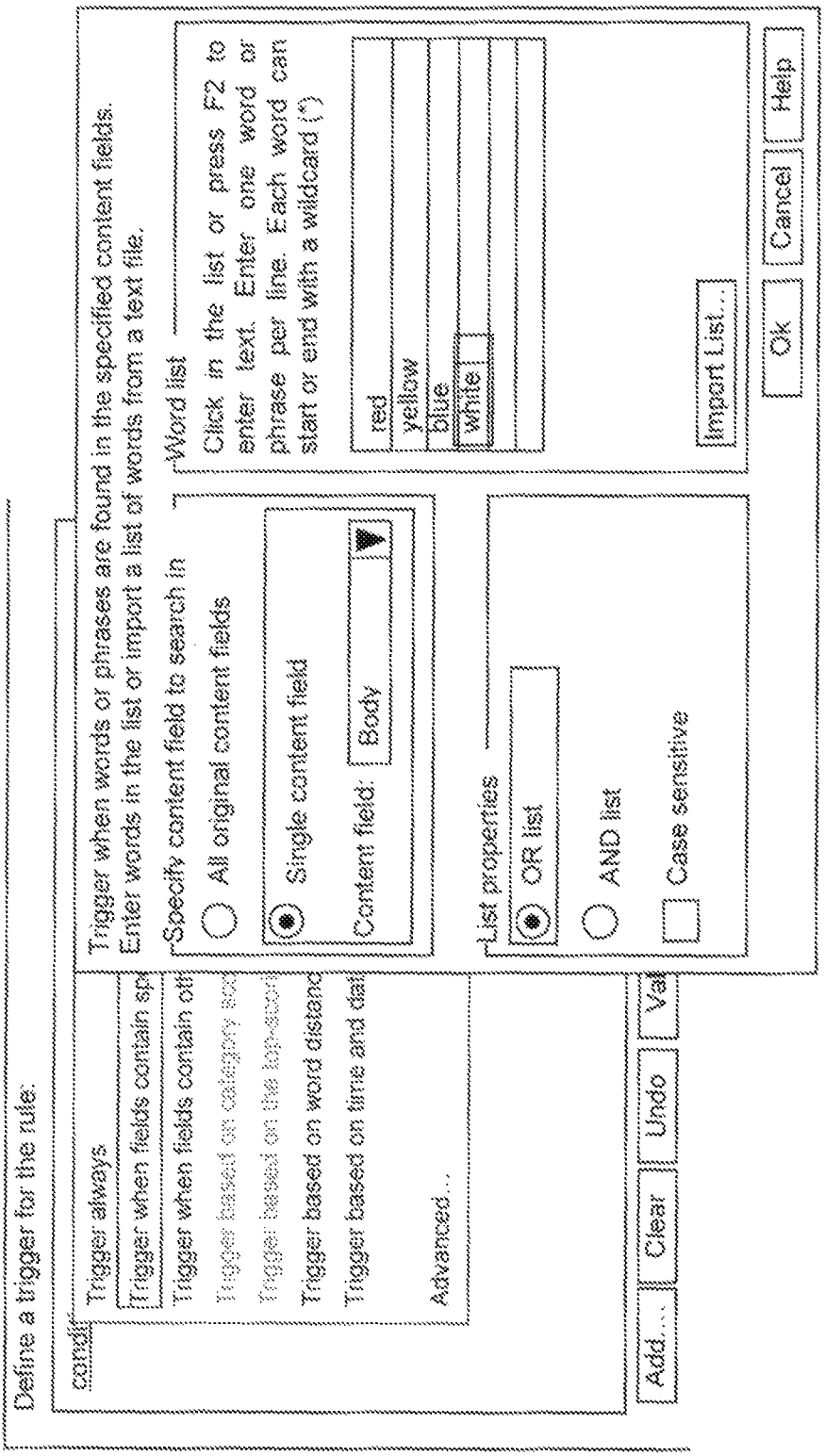
Figure 3T:
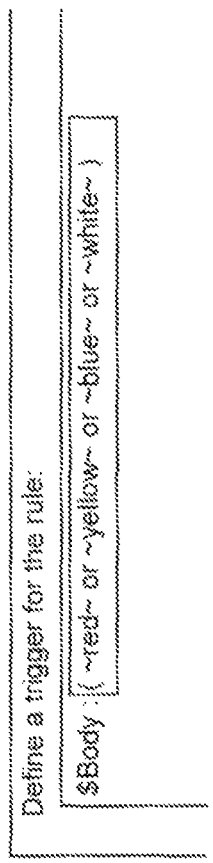
Figure 3U:
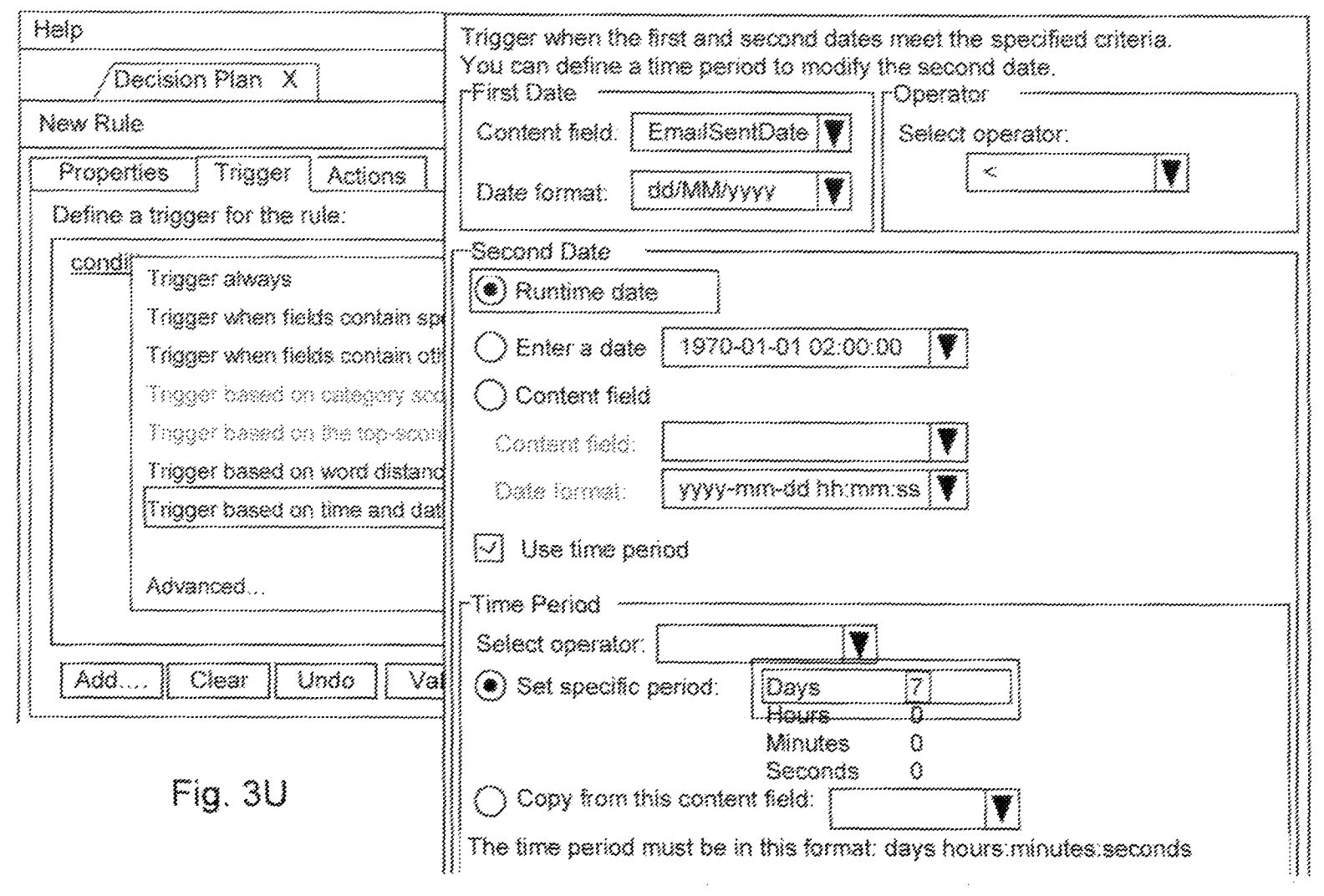
Figure 3W:
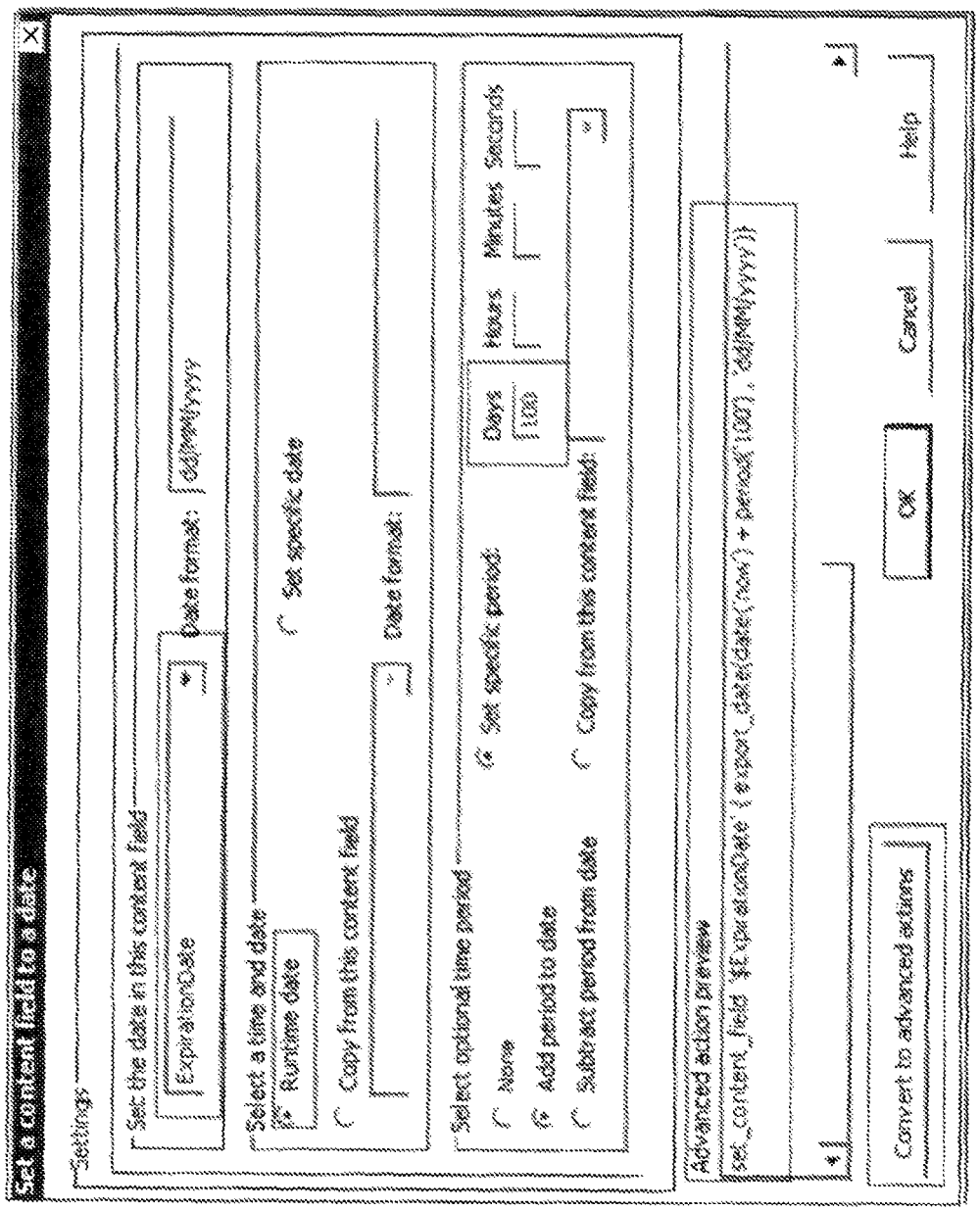

As described above, predefined templates may be used to encapsulate commonly used expressions. For example, a "word search" rule may be defined using a predefined "trigger when fields contain specific words or phrases" template as shown in FIGS. 3R and 3S, resulting in the expression as shown in FIG. 3T. Similarly, a template may be used to define an expression using time and date as shown in FIGS. 3U and 3V where the expression checks for emails that have been sent more than a week before a runtime date. A template may be transformed into its basic building blocks which can then be modified separately. Thus, for example, if an ExpirationDate is to be calculated for a period of 100 days, a "time and date" template may be used such as is shown in FIG. 3W, where parametric changes can be made in the dialog shown, while allowing for more fundamental changes to be made by converting the template into basic building blocks and then allowing more complex changes to be made.

Figure 4:
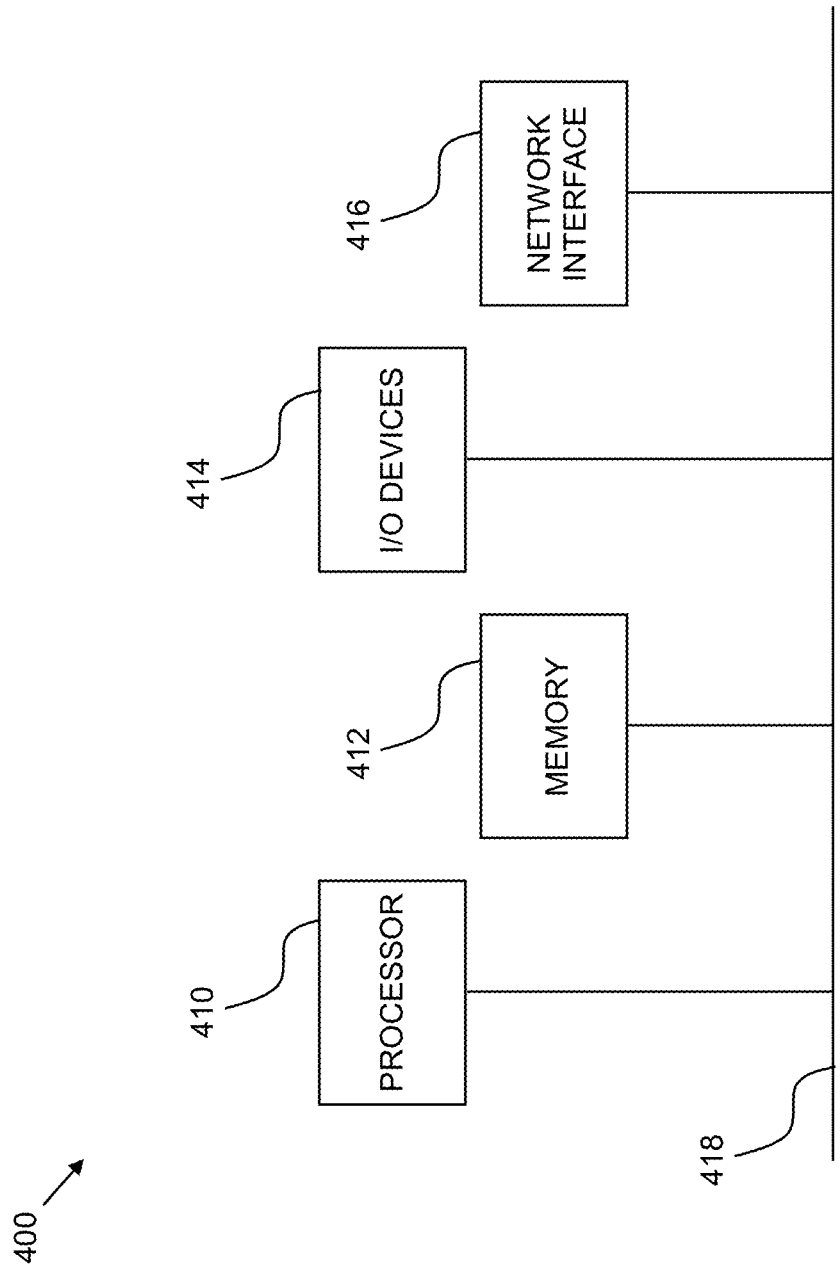
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3W) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for building an expression, the method comprising:
    displaying, using a processor of a computer, an expression on a computer display via a graphical user interface, where the expression includes a non-terminal display object corresponding to a non-terminal element defined in a grammar; and
    in response to receiving selection of the non-terminal display object,
        displaying, using the processor of the computer, a candidate terminal display object and a candidate non-terminal display object, where the candidate terminal display object corresponds to a terminal element within the grammar, and where the candidate non-terminal display object corresponds to another non-terminal element within the grammar;
        in response to receiving selection of the candidate terminal display object, replacing, using the processor of the computer, the selected non-terminal display object in the expression with the selected candidate terminal display object; and
        in response to receiving selection of the candidate non-terminal display object, replacing, using the processor of the computer, the selected non-terminal display object in the expression with the candidate non-terminal display object, where the candidate non-terminal display object is further replaced by one of another candidate terminal display object and another candidate non-terminal display object until no non-terminal display object remains in the displayed expression.

2. The method of claim 1 where the candidate non-terminal display object is further replaced by one of another candidate terminal display object and another candidate non-terminal display object until no non-terminal display object remains in the displayed expression absent a predefined limit.

3. The method of claim 1 and further comprising adding a new expression section to the expression.

4. The method of claim 1 where the grammar is a context-free language that is defined in a specification that conforms to the Backus-Naur Form.

5. The method of claim 1 and further comprising generating the expression to initially include the non-terminal display object corresponding to a root object defined in the grammar.

6. The method of claim 1 and further comprising identifying at least one child node within the grammar that is directly traversable from a parent node within the grammar, where the parent node is a non-terminal element within the grammar corresponding to a non-terminal display object in the displayed expression, and where the child node is one of a terminal element within the grammar and a non-terminal element within the grammar.

7. The method of claim 6 and further comprising identifying the child node responsive to receiving selection of the non-terminal display object within the displayed expression.

8. The method of claim 7 and further comprising displaying on a computer display candidate terminal display objects and candidate non-terminal display objects that correspond to the child nodes.

9. A system for building an expression, the system comprising:
    a processor; and
    storage coupled to the processor, wherein the storage stores computer program instructions, and wherein the computer program instructions are executed by the processor to perform:
        displaying an expression on a computer display via a graphical user interface, where the expression includes a non-terminal display object corresponding to a non-terminal element defined in a grammar; and
        in response to receiving selection of the non-terminal display object,
            displaying a candidate terminal display object and a candidate non-terminal display object, where the candidate terminal display object corresponds to a terminal element within the grammar, and where the candidate non-terminal display object corresponds to another non-terminal element within the grammar;
            in response to receiving selection of the candidate terminal display object, replacing the selected non-terminal display object in the expression with the selected candidate terminal display object; and
            in response to receiving selection of the candidate non-terminal display object, replacing the selected non-terminal display object in the expression with the candidate non-terminal display object, where the candidate non-terminal display object is further replaced by one of another candidate terminal display object and another candidate non-terminal display object until no non-terminal display object remains in the displayed expression.

10. The system of claim 9 where the candidate non-terminal display object is further replaced by one of another candidate terminal display object and another candidate non-terminal display object until no non-terminal display object remains in the displayed expression absent a predefined limit.

11. The system of claim 9 where the operations further comprise adding a new expression section to the expression.

12. The system of claim 9 where the the grammar is a context-free language that is defined in a specification that conforms to the Backus-Naur Form.

13. The system of claim 9 where the operations further comprise generating the expression to initially include the non-terminal display object corresponding to a root object defined in the grammar.

14. The system of claim 9 where the operations further comprise identifying at least one child node within the grammar that is directly traversable from a parent node within the grammar, where the parent node is a non-terminal element within the grammar corresponding to a non-terminal display object in the displayed expression, and where the child node is one of a terminal element within the grammar and a non-terminal element within the grammar.

15. The system of claim 14 where the operations further comprise identifying the child node responsive to receiving selection of the non-terminal display object within the displayed expression.

16. The system of claim 15 where the operations further comprise displaying on a computer display candidate terminal display objects and candidate non-terminal display objects that correspond to the child nodes.

17. A computer program product for building an expression, the computer program product comprising:
a non-transitory computer-readable storage medium; and
computer-readable program code embodied in the non-transitory computer-readable storage medium, where the computer-readable program code, when executed by a processor of a computer, is configured to perform:
displaying an expression on a computer display via a graphical user interface, where the expression includes a non-terminal display object corresponding to a non-terminal element defined in a grammar; and
in response to receiving selection of the non-terminal display object,
displaying a candidate terminal display object and a candidate non-terminal display object, where the candidate terminal display object corresponds to a terminal element within the grammar, and where the candidate non-terminal display object corresponds to another non-terminal element within the grammar;
in response to receiving selection of the candidate terminal display object, replacing the selected non-terminal display object in the expression with the selected candidate terminal display object; and
in response to receiving selection of the candidate non-terminal display object, replacing the selected non-terminal display object in the expression with the candidate non-terminal display object, where the candidate non-terminal display object is further replaced by one of another candidate terminal display object and another candidate non-terminal display object until no non-terminal display object remains in the displayed expression.

18. The computer program product of claim 17 where the candidate non-terminal display object is further replaced by one of another candidate terminal display object and another candidate non-terminal display object until no non-terminal display object remains in the displayed expression absent a predefined limit.

19. The computer program product of claim 17 where the computer-readable program code is configured to perform adding a new expression section to the expression.

20. The computer program product of claim 17 where the grammar is a context-free language that is defined in a specification that conforms to the Backus-Naur Form.

21. The computer program product of claim 17 where the computer-readable program code is configured to perform generating the expression to initially include the non-terminal display object corresponding to a root object defined in the grammar.

22. The computer program product of claim 17 where the computer-readable program code is configured to perform identifying at least one child node within the grammar that is directly traversable from a parent node within the grammar, where the parent node is a non-terminal element within the grammar corresponding to a non-terminal display object in the displayed expression, and where the child node is one of a terminal element within the grammar and a non-terminal element within the grammar.

23. The computer program product of claim 22 where the computer-readable program code is configured to perform identifying the child node responsive to receiving selection of the non-terminal display object within the displayed expression.

24. The computer program product of claim 23 where the computer-readable program code is configured to perform displaying on a computer display candidate terminal display objects and candidate non-terminal display objects that correspond to the child nodes.

\* \* \* \* \*